(12) United States Patent
Antony

(10) Patent No.: US 9,753,809 B2
(45) Date of Patent: Sep. 5, 2017

(54) CRASH MANAGEMENT OF HOST COMPUTING SYSTEMS IN A CLUSTER

(71) Applicant: VMWARE, INC., Palo Alto, CA (US)

(72) Inventor: Jinto Antony, Bangalore (IN)

(73) Assignee: VMware, Inc., Palo Alto, CA (US)

( * ) Notice: Subject to any disclaimer, the term of this patent is extended or adjusted under 35 U.S.C. 154(b) by 58 days.

(21) Appl. No.: 14/829,653

(22) Filed: Aug. 19, 2015

(65) Prior Publication Data
US 2016/0371149 A1 Dec. 22, 2016

(30) Foreign Application Priority Data

Jun. 18, 2015 (IN) .......................... 3061/CHE/2015

(51) Int. Cl.
*G06F 11/00* (2006.01)
*G06F 11/14* (2006.01)

(52) U.S. Cl.
CPC ...... *G06F 11/1441* (2013.01); *G06F 11/1451* (2013.01); *G06F 11/1469* (2013.01); *G06F 2201/805* (2013.01); *G06F 2201/84* (2013.01)

(58) Field of Classification Search
CPC .................................................. G06F 11/1441
USPC ...... 714/38.11, 38.1, 38.12, 38.13, 38.14, 39
See application file for complete search history.

(56) References Cited

U.S. PATENT DOCUMENTS

| 8,375,386 B2 * | 2/2013 | Hendel | G06F 9/45533 |
| | | | 714/37 |
| 2008/0126879 A1 * | 5/2008 | Tiwari | G06F 11/0712 |
| | | | 714/46 |

* cited by examiner

*Primary Examiner* — Dieu-Minh Le

(57) ABSTRACT

Techniques for managing crash in a host computing system in a cluster are disclosed. In one embodiment, a core dump partition may be configured in memory associated with a remote access controller (RAC) within the host computing system. When the host computing system is crashed, a screen shot associated with the host computing system is obtained through the RAC. Further, a first occurrence of crash in the host computing system is determined based on the obtained screen shot. Furthermore, the core dump file associated with the first occurrence of crash is copied from the core dump partition to a shared datastore. Also, the host computing system is reset through the RAC upon copying the core dump file to the shared datastore.

20 Claims, 6 Drawing Sheets

CRASH MANAGEMENT OF HOST COMPUTING SYSTEMS IN A CLUSTER

RELATED APPLICATIONS

Benefit is claimed under 35 U.S.C. 119(a)-(d) to Foreign application Serial No. 3061/CHE/2015 filed in India entitled "CRASH MANAGEMENT OF HOST COMPUTING SYSTEMS IN A CLUSTER", on Jun. 18, 2015, by VMware, Inc., which is herein incorporated in its entirety by reference for all purposes.

TECHNICAL FIELD

The present disclosure relates to cluster resource management, and more particularly to methods, techniques, and systems for managing crash in host computing systems in a cluster.

BACKGROUND

Generally, host computing systems in a cluster may experience a system-wide-exception, which is an unexpected event that may result in a system crash. System errors of a host computing system (e.g., a computer) usually occur due to device driver conflicts, program crashes, data destroyed by virus, hardware failures, incorrect memory access and other capable reasons. Further, a critical system error may cause a screen of death (SOD) (e.g., purple SOD, blue SOD, and the like) in the host computing system.

When the host computing system is crashed, the host computing system may be disconnected and may not be accessible in the cluster, resulting in state of the host computing system at the time of the crash to be lost.

DETAILED DESCRIPTION

Figure 1:
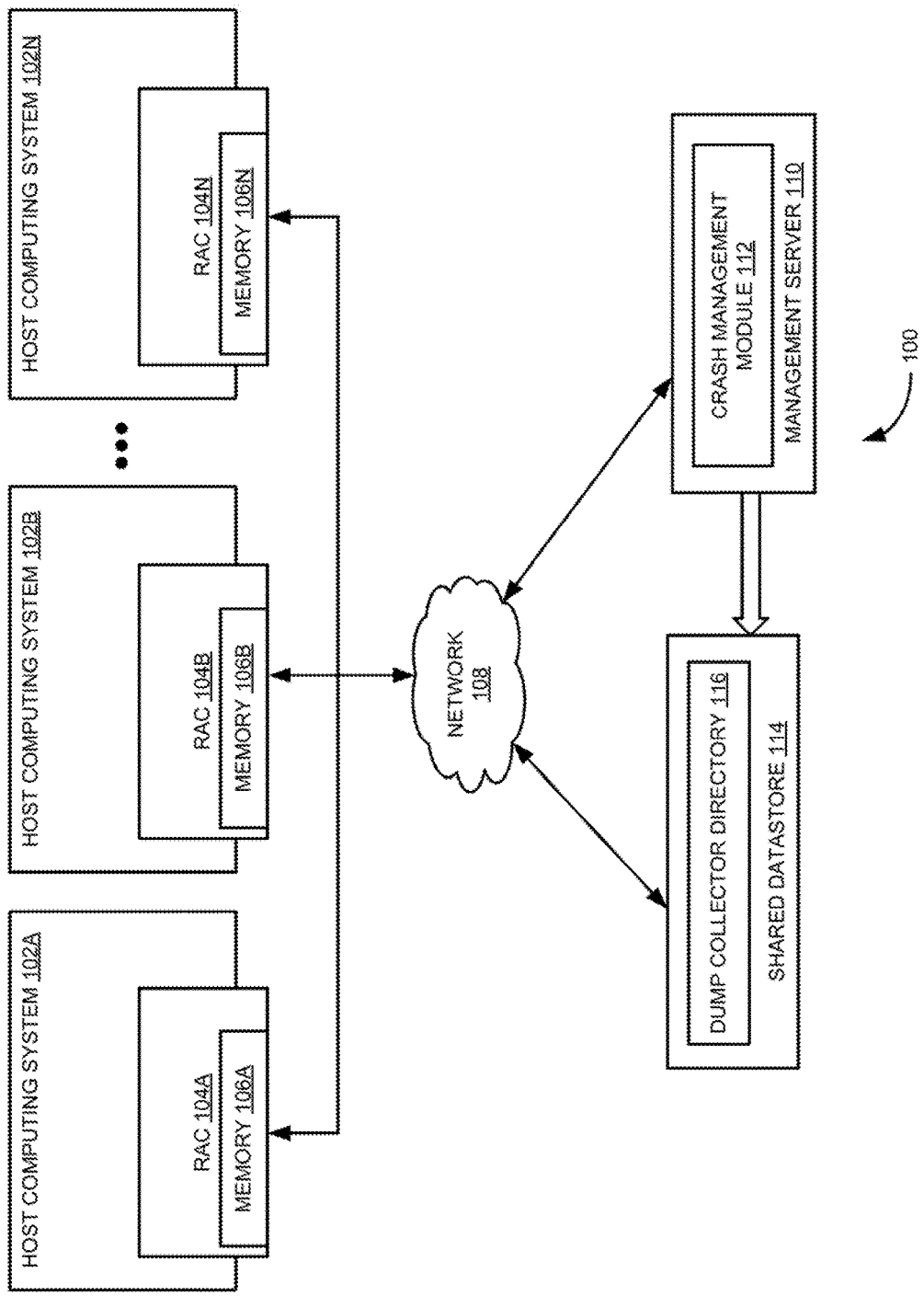
FIG. 1 depicts a system for managing crashes in a host computing system in a cluster, according to an example embodiment.

Embodiments described herein provide enhanced computer-based and network-based method, technique, and system for managing crash in a host computing system in a cluster. The terms "crash", "system crash" and "server crash" are used interchangeably throughout the document. Example crash may generate a screen of death (SOD). The SOD may be a diagnostic screen that reports information associated with the crash. For example, the term "SOD" may be an error message displayed on an even background color with a message, for instance, advising the user to restart the host computing system. Example SOD may include, but not limited to, blue screen of death, black screen of death, red screen of death, purple SOD, white SOD, yellow SOD, and green SOD. For example, the SOD may detail a state of a memory in the host computing system at the time of the crash and includes other information such as the host computing system version and build, exception type, register dump, information about a software application running on CPU at the time of the crash, backtrace, server uptime, error messages, core dump information and the like. Further, the term core dump may refer to a file that includes diagnostic information related to the SOD and data collected from memory at the time of crash. The diagnostic information may be used to determine a root cause analysis for a system error. The terms core dump, crash dump, memory dump, and storage dump are used interchangeably throughout the document.

When the host computing system is crashed, the host computing system may be disconnected and may not be accessible in the cluster, resulting in state of the host computing system at the time of the crash to be lost. For example, the host computing system can be crashed due to software and/or hardware failures such as device driver conflicts, program crashes, data destroyed by virus, software failure while running kernel application, hard drive corruption, and/or boot processing error, and the like. In some examples, any workloads/virtual machines (VMs) that are running on the host computing system may be terminated without saving the state of the VMs when the host computing system has crashed.

In this case, a user/administrator may need to capture the screenshot of the SOD and reset the host computing system to collect the core dump file from a local disk of the host computing system. When the host computing system remains unavailable, workloads/VMs are started on the remaining host computing systems (e.g., by VMware® High Availability (HA)), and hence may impact the performance of the cluster since the cluster has fewer resources to execute the workloads/VMs.

Examples described herein provide enhanced methods, techniques, and systems for crash management of the host computing system. In one embodiment, a core dump partition may be configured in a memory associated with a remote access controller (RAC) within the host computing system. For example, the core dump partition is used to store a core dump file when the host computing system is crashed. When the host computing system is crashed, a screen shot associated with the host computing system is obtained through the RAC. Further, a first occurrence of crash in the host computing system is determined based on the obtained screen shot. Furthermore, a core dump file associated with the first occurrence of crash is copied from the core dump partition to a shared datastore. Also, the host computing system is dynamically reset through the RAC upon copying the core dump file to the shared datastore.

Further, a number of occurrences of crash in the host computing system may be determined. Core dump files associated with the subsequent occurrence of crashes are copied from the core dump partition to the shared datastore. At each occurrence of crash, a check is made to determine whether the number of occurrences of substantially identical crash is greater than the predefined threshold value by analyzing the core dump files stored in the shared datastore. Further, the host computing system is reset through the RAC when the number of occurrences of substantially identical crash is not greater than the predefined threshold value. Further, an alert message may be generated when the number of occurrences of substantially identical crash is greater than the predefined threshold value.

System Overview and Examples of Operation

FIG. 1 depicts example system 100 for managing crashes in host computing systems 102A-N that are communicatively connected to management server 110 via network 108. As shown in FIG. 1, host computing systems 102A-N include RACs 104A-N, respectively. Further, each of RACs 104A-N is associated with a respective one of memories 106A-N. The RACs 104A-N may enable remote management of host computing systems 102A-N and reduce the need for an administrator/user to physically visit host computing systems 102A-N to accomplish configuration or maintenance of host computing systems 102A-N. Example RAC may include an interface card such as an integrated dell remote access card (iDRAC) or HP/IBM integrated lights-out (iLO) card. For example, iDRAC uses the intelligent platform management interface (IPMI) standard that provides management and monitoring of host computing systems 102A-N, independently of CPU, firmware and operating system of host computing systems 102A-N. Further, memories 106A-N can be remotely connected to the RACs 104A-N or inbuilt into RACs 104A-N such that memories 106A-N can be accessed through RACs 104A-N when any of host computing systems 102A-N is crashed. Example memory associated with the RAC may include a flash memory, a secure digital (SD) card or any other memory that is associated with RACs 104A-N.

Management server 110 includes crash management module 112 to perform crash management in host computing systems 102A-N. For example, crash management module 112 can be a part of management software residing in management server 110. One skilled in the art can appreciate that crash management module 112 can also be provided in a software application that can run on host computing systems 102A-N. Also, the example system 100 includes shared datastore 114 that is connected to host computing systems 102A-N and management server 110 via network 108. The shared datastore 114 includes dump collector directory 116.

Figure 2A:
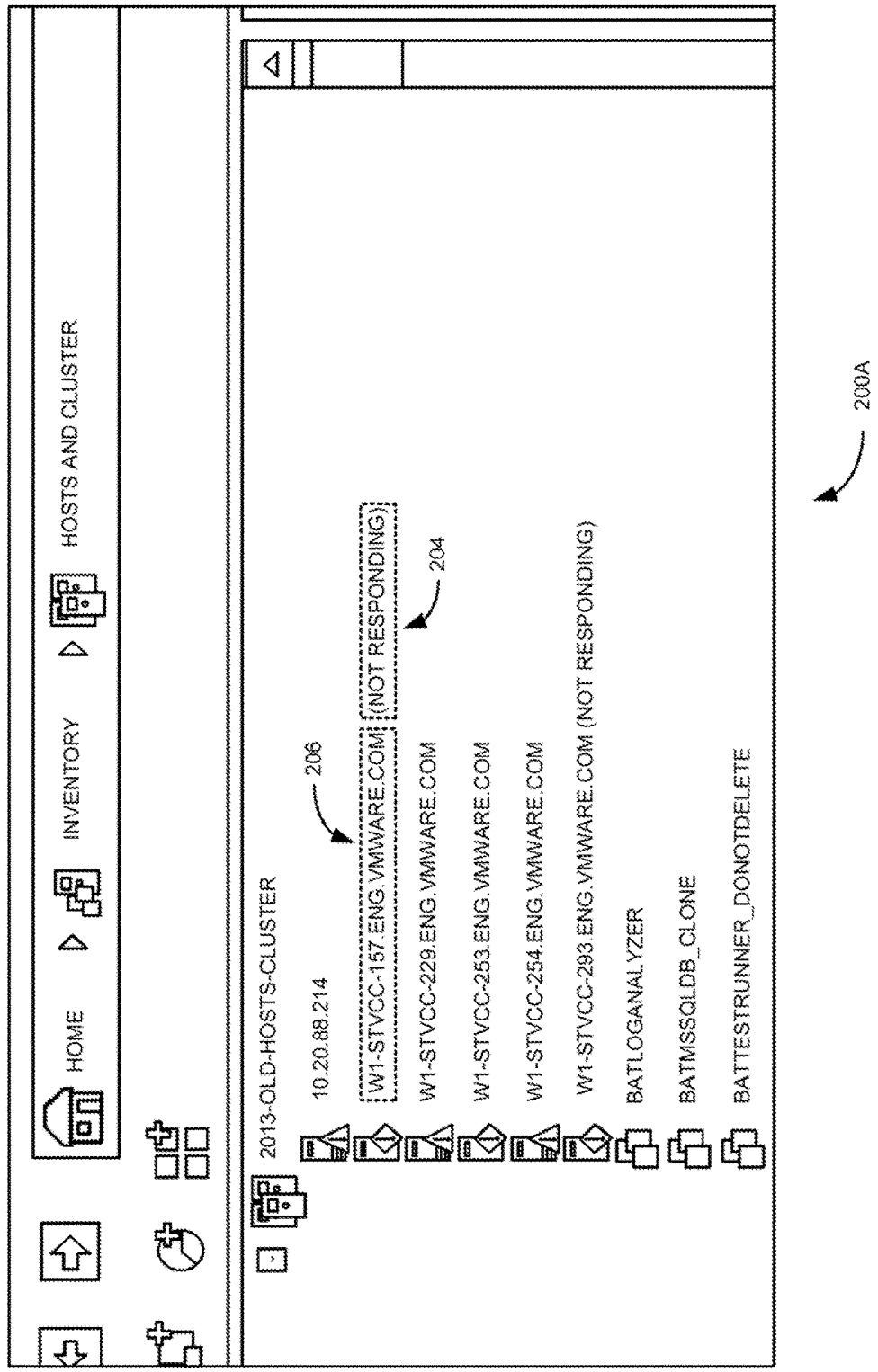
FIG. 2A is an example interface depicting host computing systems that are disconnected from the cluster.

In operation, crash management module 112 configures core dump partition in memories 106A-N associated with RACs 104A-N within host computing systems 102A-N that are specified to be managed for crashes. Further, crash management module 112 monitors each of host computing systems 102A-N that are specified to be managed for crashes to detect a host computing system that is disconnected from the cluster. FIG. 2A is an example interface 200A depicting disconnected host computing systems in event of a system failure. Example interface 200A depicts inventory 202 including information associated with each host computing system that is connected to the cluster. Example information associated with the each host computing system may indicate a status 204, an identifier 206 of host computing systems 102A-N and the like. For example, when the host computing system 102A (e.g., identifier 206) is crashed and disconnected from the cluster, then the status 204 may be indicated as "not responding".

Figure 2B:
FIG. 2B is an example screenshot of a screen of death (SOD) associated with a crash in the host computing system.

Further, crash management module 112 obtains a screen shot associated with host computing system 102A through RAC 104A when host computing system 102A is crashed. Further in operation, crash management module 112 determines a first occurrence of crash in host computing system 102A based on the screen shot obtained from host computing system 102A. For example, FIG. 2B depicts a screenshot 200B of a SOD associated with a crash in a host computing system 102A. In one example, the first occurrence of purple SOD associated with the crash in host computing system 102A may be determined if the background color of the obtained screenshot is purple. One skilled in the art can appreciate that other SODs such as blue SOD, black SOD, red SOD, white SOD, yellow SOD, and green SOD, and the like can also be determined based on the obtained screenshot.

Further, crash management module 112 copies core dump file associated with the first occurrence of crash from the core dump partition to dump collector directory 116 in shared datastore 114, upon determining the first occurrence of crash in host computing system 102A. Crash management module 112 resets host computing system 102A through RAC 104A using the RAC IPMI commands upon copying the core dump file. Host computing system 102A can be joined back to the cluster and operative upon resetting host computing system 102A.

Further in operation, crash management module 112 determines a second occurrence of crash in host computing system 102A, and copies core dump file associated with the second occurrence of crash to dump collector directory 116 in shared datastore 114. Further, crash management module 112 determines that the second occurrence of crash is substantially identical to the first occurrence of crash by analyzing the core dump files associated with the second occurrence of crash and the first occurrence of crash in shared datastore 114. For an example, if the first occurrence of crash and the second occurrence of crash are caused in host computing system 102A due to substantially similar error, then the first occurrence of crash and the second occurrence of crash are determined as substantially identical. In one exemplary implementation, logs may be extracted from core dump files associated with the second occurrence of crash and the first occurrence of crash from dump collector directory 116. The extracted logs may be analyzed for determining whether the second occurrence of crash is substantially identical to the first occurrence of crash.

Further in operation, crash management module 112 determines whether a number of occurrences of substantially identical crash is greater than a predefined threshold value. In one example, crash management module 112 dynamically/automatically resets host computing system 102A through RAC 104A when the number of occurrences of substantially identical crash is not greater than the predefined threshold value. In another example, crash management module is configured to generate an alert message when the number of occurrences of substantially identical crash is greater than the predefined threshold value.

For example, consider that the predefined threshold value is set as 2. Further, consider that the second occurrence of crash is determined as substantially identical to the first occurrence of crash in host computing system 102A. In this case, the number of occurrences of substantially identical crash is 2, which is not greater than the predefined threshold value. Therefore, crash management module 112 resets host computing system 102A through RAC 104A. Host computing system 102A may be joined back to the cluster and operative upon resetting host computing system 102A. Further, when a third occurrence of crash is determined as substantially identical to the previous occurrences of crash (e.g., the first occurrence of crash and the second occurrence of crash) in host computing system 102A, then the number of occurrences of substantially identical crash becomes 3 which is greater than the predefined threshold value 2. In this case, crash management module 112 disables the resetting of host computing system 102A through RAC 104A and generates the alert message indicating that host computing system 102A is crashed due to a critical software/hardware failure which requires attention.

Although certain terms are used primarily herein, other terms could be used interchangeably to yield equivalent embodiments and examples. For example, the term "host computing system" may be used interchangeably with "physical host", "physical machine" or "physical device". Further, the terms "dynamic" and "automatic" are also used interchangeably throughout the document. The terms "datastore" and "database" are also used interchangeably throughout the document. Further for example, it is well-known that equivalent terms in the field of system virtualization or similar or related fields could be substituted for such terms as "physical computer," "hypervisor." "virtual machine." or the like. Furthermore, the terms "cluster" may refer to a group of host computing systems that work together in a physical or virtual computing environment. Numerous specific details are set forth herein, such as data formats and code sequences and the like, in order to provide a thorough understanding of the described techniques. The embodiments described also can be practiced without some of the specific details described herein, or with other specific details, such as changes with respect to the ordering of the logic, different logic, different architectures, or the like. Thus, the scope of the techniques and/or functions described is not limited by the particular order, selection, or decomposition of aspects described with reference to any particular routine, module, component, or the like.

Example Processes

Figure 3:
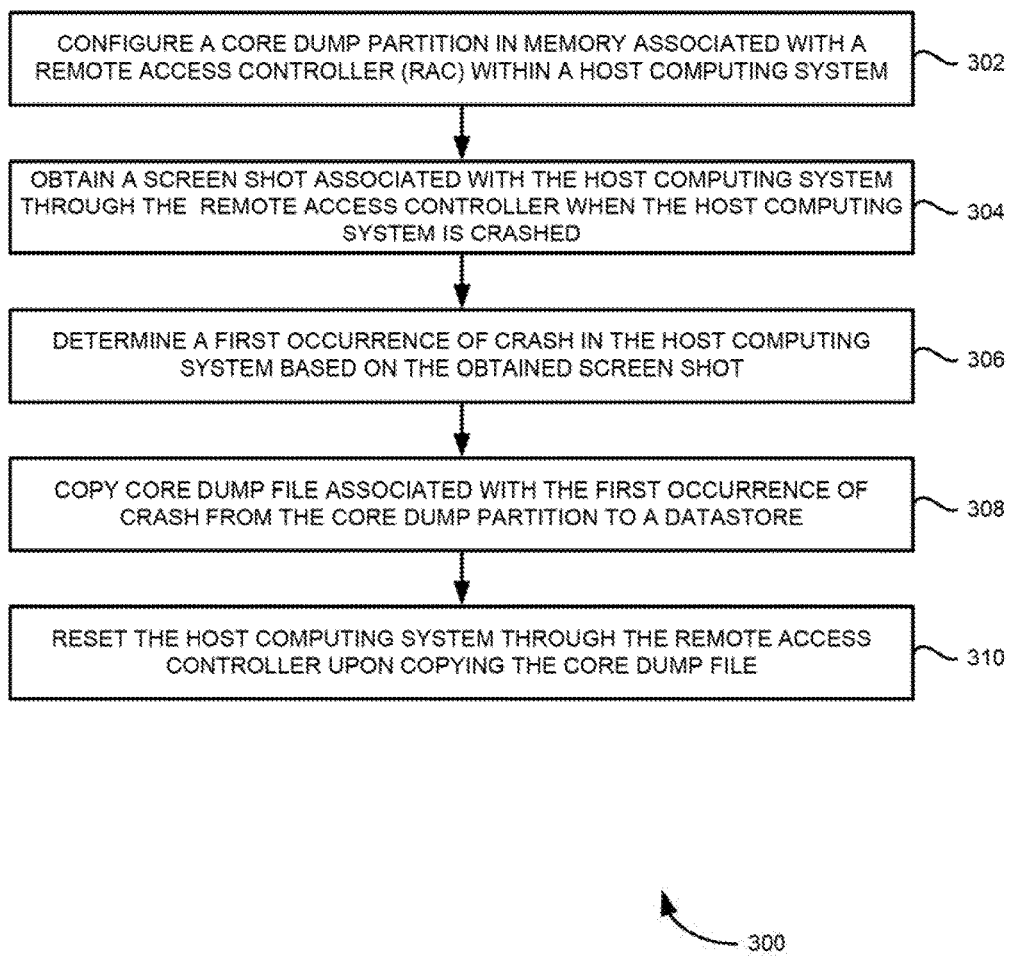
FIG. 3 is a flow diagram of a method for managing a crash in a host computing system in a cluster, according to an example embodiment.

FIG. 3 depicts a flow diagram 300 of a method for managing crash in a host computing system in a cluster. Referring to flow diagram 300 of FIG. 3, at step 302, a core dump partition may be configured in a memory associated with a RAC within the host computing system. For example, a flash memory may be inserted to the RAC such that the core dump partition configured in the flash memory may be managed remotely by a management server through the RAC.

At step 304, a screen shot associated with the host computing system may be obtained through the RAC when the host computing system is crashed. At step 306, a first occurrence of crash in the host computing system may be determined based on the screen shot obtained from the host computing system. In one exemplary implementation, the first occurrence of the crash may be determined in the host computing system when the error message in the screenshot (e.g., screenshot of SOD associated with the crash) matches a predefined error code.

At step 308, the core dump file associated with the first occurrence of crash may be copied from the core dump partition (i.e., configured in the memory associated with the RAC) to a shared datastore. For example, the crash dump file may be stored in a dump collector directory within the shared datastore. At step 310, the host computing system may be reset through the RAC upon copying the core dump file to the dump collector directory. For example, the host computing system may be remotely reset by the management server through the RAC upon copying the core dump file in the shared datastore. The host computing system can be joined back to the cluster and operative upon resetting the host computing system.

Figure 4:
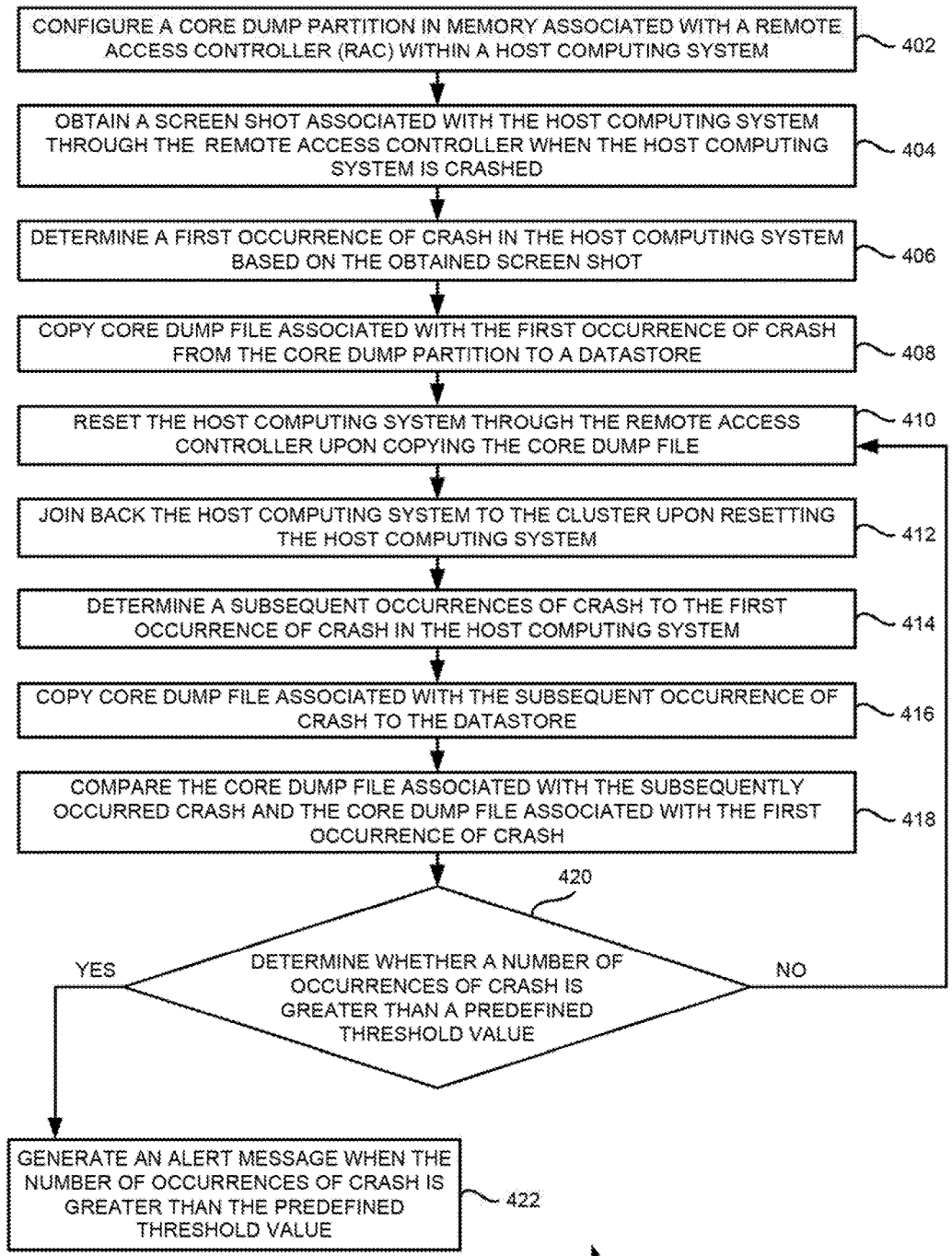
FIG. 4 depicts a flow diagram of a method for managing multiple crashes in a host computing system in a cluster, according to an example embodiment.

FIG. 4 depicts a flow diagram of method for managing multiple crashes in a host computing system in a cluster. At step 402, a core dump partition may be configured in a memory associated with a RAC within the host computing system. At step 404, a screen shot associated with the host computing system may be obtained through the RAC when the host computing system is crashed.

At step 406, a first occurrence of crash in the host computing system may be determined based on the screen shot obtained from the host computing system. At step 408, the core dump file associated with the first occurrence of crash may be copied from the core dump partition (i.e., configured in the memory associated with the RAC) to a shared datastore. At step 410, the host computing system may be reset through the RAC upon copying the core dump file from the core dump partition to a dump collector directory. At step 412, the host computing system can be joined back to the cluster and operative upon resetting the host computing system.

At step 414, a subsequent occurrence of crash in the host computing system may be determined. For example, the subsequent occurrence of crash may be a second occurrence of crash, i.e., an occurrence of crash at second time in the host computing system. At step 416, the core dump file associated with the subsequent occurrence of crash is copied from the core dump partition (i.e., configured in the memory associated with the RAC) to a dump collector directory in the shared datastore.

At step 418, the core dump file associated with the subsequent occurrence of crash is compared to the core dump file associated with previous occurrences of crash. In case of the second occurrence of crash, the core dump file associated with the second occurrence of crash is compared to the core dump file associated with the first occurrence of crash. When the first occurrence of crash and the second occurrence of crash are caused in the host computing system due to same error, then the first occurrence of crash and the second occurrence of crash are determined as substantially identical.

At step 420, a check is made to determine whether a number of occurrences of the identical crash is greater than a predefined threshold value. When the number of occurrences of substantially identical crash is not greater than the predefined threshold value, then process 400 goes back to the step 410, to reset the host computing system through the RAC. Further, the step 410 to the step 422 may be repeated till the number of occurrences of crash is greater than the predefined threshold value.

At step 422, an alert message may be generated indicating that host computing system 102A is crashed due to a critical software/hardware failure which requires attention when the number of occurrences of crash is greater than the predefined threshold value. Further, the resetting of the host computing system may be disabled through the RAC when the number of occurrences of substantially identical crash is greater than the predefined threshold value.

Although the flow diagram of FIGS. 3 and 4 illustrate specific orders of execution, the order of execution can differ from that which is illustrated. For example, the order of execution of the blocks can be scrambled relative to the order shown. Also, the blocks shown in succession can be executed concurrently or with partial concurrence. All such variations are within the scope of the present subject matter.

Figure 5:
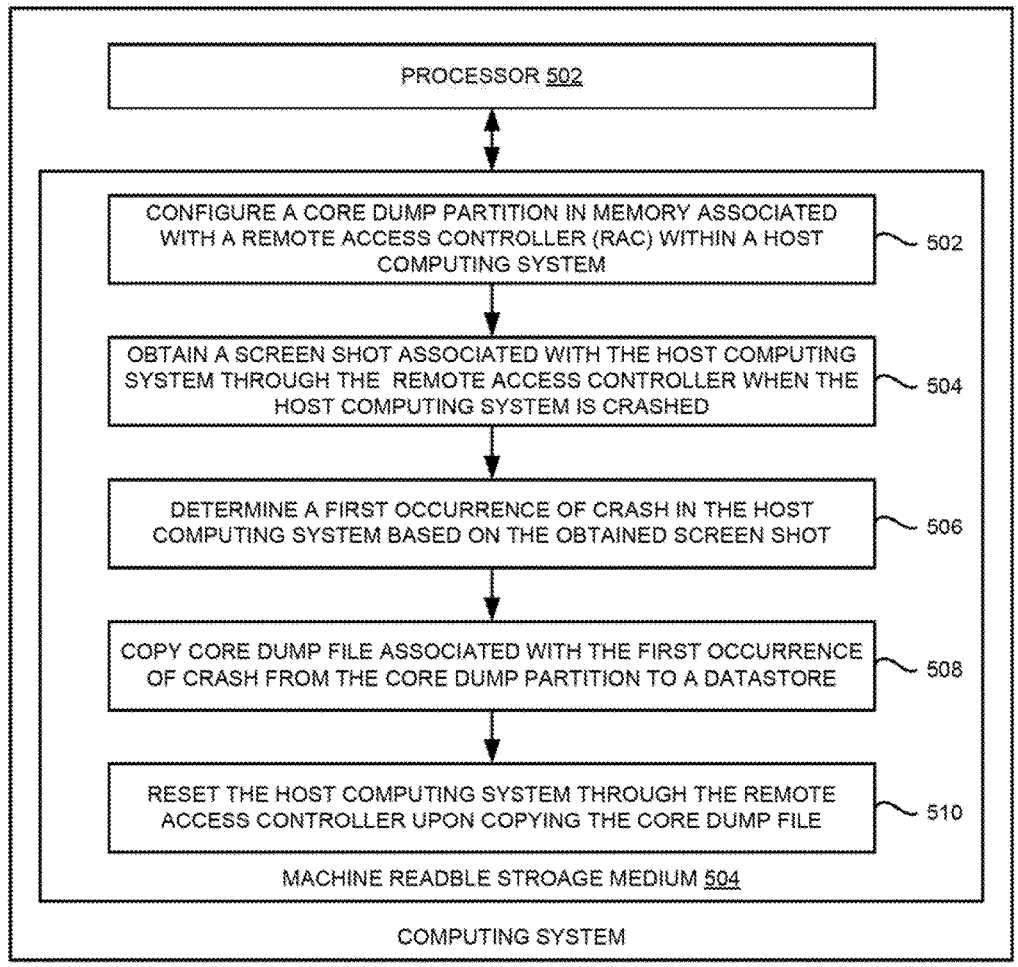
FIG. 5 is a block diagram of an example computing system for managing crash in a host computing system in a cluster.

FIG. 5 illustrates a block diagram of an example computing system 500 for managing system crash. The computing system 500 includes a processor 502 and a machine-readable storage medium 504 communicatively coupled through a system bus. The processor 502 may be any type of central processing unit (CPU), microprocessor, or processing logic that interprets and executes machine-readable instructions stored in the machine-readable storage medium 504. The machine-readable storage medium 504 may be a random access memory (RAM) or another type of dynamic storage device that may store information and machine-readable instructions that may be executed by the processor 502. For example, the machine-readable storage medium 504 may be synchronous DRAM (SDRAM), double data rate (DDR), Rambus® DRAM (RDRAM), Rambus® RAM, etc., or storage memory media such as a floppy disk, a hard disk, a CD-ROM, a DVD, a pen drive, and the like. In an example, the machine-readable storage medium 504 may be a non-transitory machine-readable medium. In an example, the machine-readable storage medium 504 may be remote but accessible to the computing system 500.

The machine-readable storage medium 504 may store instructions 502, 504, 506, 508, and 510. In an example, instructions 502, 504, 506, 508, and 510 may be executed by processor 502 for easy management and troubleshooting of system crash.

Some or all of the system components and/or data structures may also be stored as contents (e.g., as executable or other machine-readable software instructions or structured data) on a non-transitory computer-readable medium (e.g., as a hard disk; a computer memory; a computer network or cellular wireless network or other data transmission medium; or a portable media article to be read by an appropriate drive or via an appropriate connection, such as a DVD or flash memory device) so as to enable or configure the computer-readable medium and/or one or more host computing systems or devices to execute or otherwise use or provide the contents to perform at least some of the described techniques. Some or all of the components and/or data structures may be stored on tangible, non-transitory storage mediums. Some or all of the system components and data structures may also be provided as data signals (e.g., by being encoded as part of a carrier wave or included as part of an analog or digital propagated signal) on a variety of computer-readable transmission mediums, which are then transmitted, including across wireless-based and wired/cable-based mediums, and may take a variety of forms (e.g., as part of a single or multiplexed analog signal, or as multiple discrete digital packets or frames). Such computer program products may also take other forms in other embodiments. Accordingly, embodiments of this disclosure may be practiced with other computer system configurations.

It may be noted that the above-described examples of the present solution is for the purpose of illustration only. Although the solution has been described in conjunction with a specific embodiment thereof, numerous modifications may be possible without materially departing from the teachings and advantages of the subject matter described herein. Other substitutions, modifications and changes may be made without departing from the spirit of the present solution. All of the features disclosed in this specification (including any accompanying claims, abstract and drawings), and/or all of the steps of any method or process so disclosed, may be combined in any combination, except combinations where at least some of such features and/or steps are mutually exclusive.

The terms "include," "have," and variations thereof, as used herein, have the same meaning as the term "comprise" or appropriate variation thereof. Furthermore, the term "based on", as used herein, means "based at least in part on." Thus, a feature that is described as based on some stimulus can be based on the stimulus or a combination of stimuli including the stimulus.

The present description has been shown and described with reference to the foregoing examples. It is understood, however, that other forms, details, and examples can be made without departing from the spirit and scope of the present subject matter that is defined in the following claims.

The invention claimed is:

1. A method for managing crash in a host computing system in a cluster, comprising:
configuring, by a management server, a core dump partition in memory associated with a remote access controller (RAC) within the host computing system, wherein the RAC enables remote management of the host computing system to perform configuration or maintenance of the host computing system;
obtaining, by the management server, a screen shot associated with the host computing system through the RAC when the host computing system is crashed;
determining, by the management server, a first occurrence of crash in the host computing system based on the obtained screen shot;
copying, by the management server, core dump file associated with the first occurrence of crash from the core dump partition to a shared datastore; and
resetting the host computing system, by the management server, through the RAC upon copying the core dump file.

2. The method of claim 1, comprising:
determining a second occurrence of crash in the host computing system;
copying core dump file associated with the second occurrence of crash to the shared datastore; and
determining whether a number of occurrences of crash is greater than a predefined threshold value; and
resetting the host computing system through the RAC when the number of occurrences of crash is not greater than the predefined threshold value.

3. The method of claim 2, further comprising:
generating an alert message when the number of occurrences of crash is greater than the predefined threshold value.

4. The method of claim 2, wherein determining whether the number of occurrences of crash is greater than the predefined threshold value, comprises:
determining that the second occurrence of crash is substantially identical to the first occurrence of crash by analyzing core dump files associated with the second occurrence of crash and the first occurrence of crash in the shared datastore; and
determining whether the number of occurrences of substantially identical crash is greater than the predefined threshold value.

5. The method of claim 1, wherein the memory comprises one of a flash memory and secure digital (SD) card.

6. The method of claim 1, wherein the host computing system is joined back to the cluster and operative upon resetting the host computing system.

7. The method of claim 1, wherein the host computing system executes at least one workload.

8. The method of claim 1, wherein the crash comprises a screen of death (SOD), and wherein the SOD details at least one of: a state of memory in the host computing system at the time of the crash, the host computing system version and build, exception type, register dump, information about a software application running on each CPU at the time of the crash, backtrace, server uptime, error messages and core dump information.

9. A system for managing crash, the system comprising:
a host computing system comprising
a remote access controller (RAC); and memory associated with the RAC;
a shared datastore; and
a management server comprising a crash management module to:
  configure a core dump partition in the memory associated with the RAC within the host computing system, wherein the RAC enables remote management of the host computing system to perform configuration or maintenance of the host computing system;
  obtain a screen shot associated with the host computing system through the RAC when the host computing system is crashed;
  determine a first occurrence of crash in the host computing system based on the obtained screen shot;
  copy core dump file associated with the first occurrence of crash from the core dump partition to the shared datastore; and
  reset the host computing system through the RAC upon copying the core dump file.

10. The system of claim 9, wherein the crash management module is configured to:
  determine a second occurrence of crash in the host computing system;
  copy core dump file associated with the second occurrence of crash to the shared datastore; and
  determine whether a number of occurrences of crash is greater than a predefined threshold value; and
  reset the host computing system through the RAC when the number of occurrences of crash is not greater than the predefined threshold value.

11. The system of claim 10, wherein the crash management module is configured to generate an alert message when the number of occurrences of crash is greater than the predefined threshold value.

12. The system of claim 10, wherein the crash management module determines whether the number of occurrences of crash is greater than the predefined threshold value, by:
  determining that the second occurrence of crash is substantially identical to the first occurrence of crash by analyzing core dump files associated with second occurrence of crash and the first occurrence of crash in the shared datastore; and
  determining whether the number of occurrences of substantially identical crash is greater than the predefined threshold value.

13. The system of claim 9, wherein the memory comprises one of a flash memory and secure digital (SD) card.

14. The system of claim 9, wherein the host computing system is joined back to a cluster and operative upon resetting the host computing system.

15. The system of claim 9, wherein the host computing system executes at least one workload.

16. The system of claim 9, wherein the crash comprises a screen of death (SOD), and wherein the SOD details at least one of: a state of memory in the host computing system at the time of the crash, the host computing system version and build, exception type, register dump, information about a software application running on each CPU at the time of the crash, backtrace, server uptime, error messages and core dump information.

17. A non-transitory computer-readable storage medium including instructions that are configured, when executed by a management server, to perform a method for managing crash in a host computing system in a cluster, the method comprising:
  configuring a core dump partition in memory associated with a remote access controller (RAC) within the host computing system, wherein the RAC enables remote management of the host computing system to perform configuration or maintenance of the host computing system;
  obtaining a screen shot associated with the host computing system through the RAC when the host computing system is crashed;
  determining a first occurrence of crash in the host computing system based on the obtained screen shot;
  copying core dump file associated with the first occurrence of crash from the core dump partition to a shared datastore; and
  resetting the host computing system through the RAC upon copying the core dump file.

18. The non-transitory computer-readable storage medium of claim 17, further comprising:
  determining a second occurrence of crash in the host computing system;
  copying core dump file associated with the second occurrence of crash to the shared datastore; and
  determining whether a number of occurrences of crash is greater than a predefined threshold value; and
  resetting the host computing system through the RAC when the number of occurrences of crash is not greater than the predefined threshold value.

19. The non-transitory computer-readable storage medium of claim 18, wherein determining whether the number of occurrences of crash is greater than the predefined threshold value, comprising:
  determining that the second occurrence of crash is substantially identical to the first occurrence of crash by analyzing core dump files associated with the second occurrence of crash and the first occurrence of crash in the shared datastore; and
  determining whether the number of occurrences of substantially identical crash is greater than the predefined threshold value.

20. The non-transitory computer-readable storage medium of claim 17, wherein the host computing system executes at least one workload.

* * * * *